(No Model.)
A. S. SMITH.
COMBINED HALTER AND BLIND.
No. 557,710.                               Patented Apr. 7, 1896.
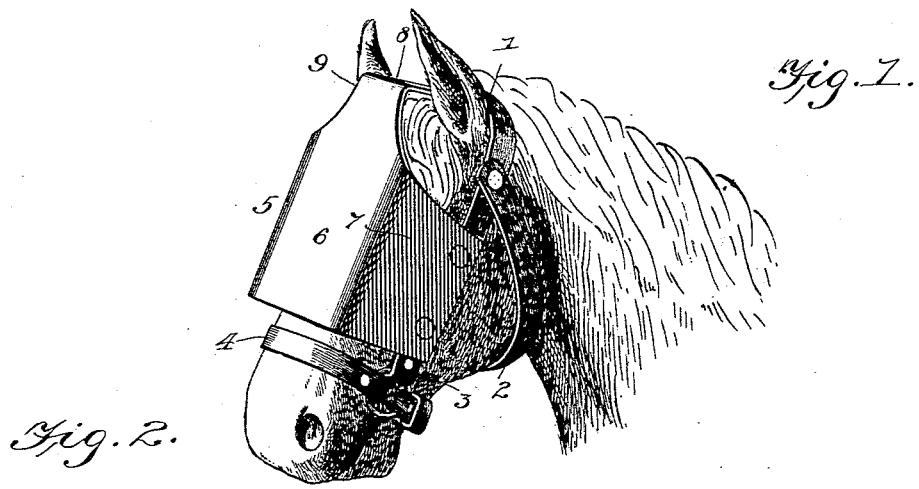
Fig. 1.
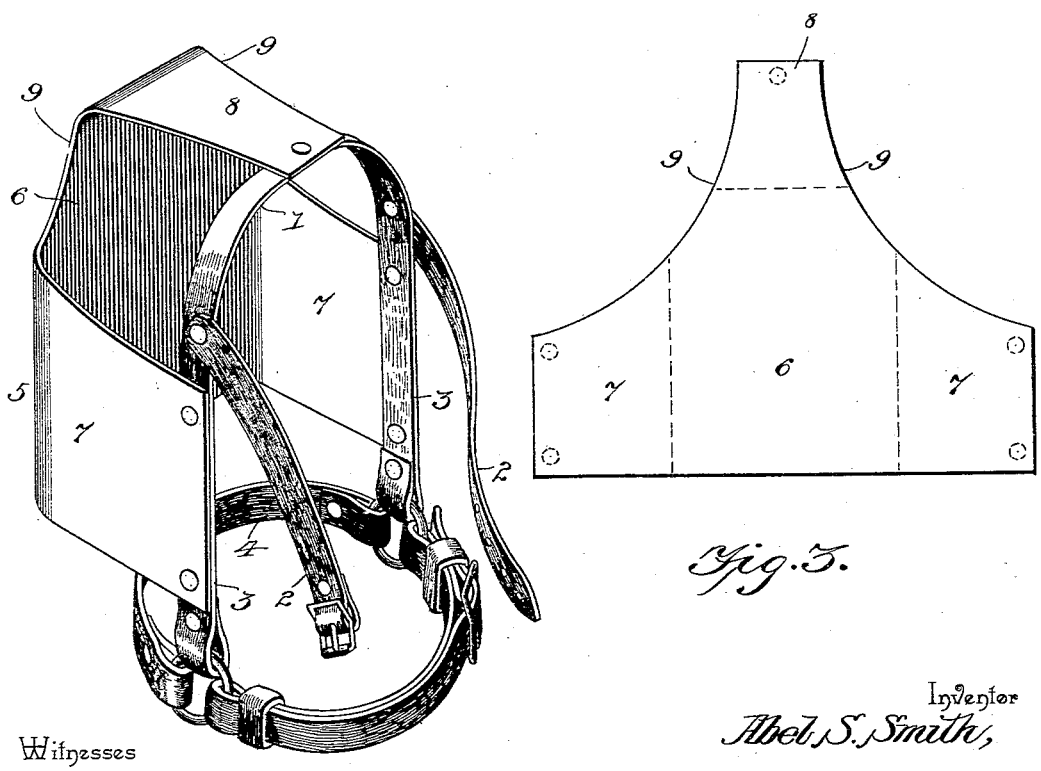
Fig. 2.
Fig. 3.
Witnesses
E. N. Monroe
V. B. Hillyard.
Inventor
Abel S. Smith,
By his Attorneys,
C. A. Snow & Co.

UNITED STATES PATENT OFFICE.

ABEL S. SMITH, OF HILLSDALE, MICHIGAN, ASSIGNOR OF ONE-HALF TO SETH H. SMITH, OF SAME PLACE.

COMBINED HALTER AND BLIND.

SPECIFICATION forming part of Letters Patent No. 557,710, dated April 7, 1896.

Application filed January 30, 1896. Serial No. 577,385. (No model.)

*To all whom it may concern:*

Be it known that I, ABEL S. SMITH, a citizen of the United States, residing at Hillsdale, in the county of Hillsdale and State of Michigan, have invented a new and useful Combined Halter and Blind, of which the following is a specification.

The purpose of this invention is to control fractious stock, particularly horses, and to prevent them from leaping over fences and other inclosures and from doing injury to themselves, property, and persons.

To attain the desired end, a halter is employed and provided with a blind so affixed thereto as to give plenty of air and room for feeding, but which will not chafe or cause injury to the animal.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof; and to a full disclosure of the invention an adaptation thereof is shown in the accompanying drawings, in which—

Figure 1 is a detail view showing the invention applied. Fig. 2 is a perspective view of the device. Fig. 3 is a detail view of the blank from which the blind is formed.

The same reference-characters denote similar and corresponding parts in all the figures of the drawings.

In carrying out the spirit of the invention a halter of suitable and approved construction is employed, and, as shown, the halter consists of a head-stall 1, a throat-latch 2, side straps 3, and a nose-band 4, combined and arranged in the usual way.

The blind 5 is preferably constructed of sheet metal, although leather or any stout sheet material may be successfully employed, the preference being given to metal because of its lightness and capability of retaining the shape imparted thereto. This blind is formed from a blank having the outline substantially as shown in Fig. 3, and comprising a body portion 6, side wings 7, and a top wing 8, the side wings being bent about at right angles to the body 6, so as to embrace the cheeks of the animal, and the top wing being bent so as to extend over the forehead and be secured to the head-stall 1 at a central point. The adjacent edges of the wings are oppositely and symmetrically curved to form spaces 9 upon each side of the top wing 8 for the reception and passage of the animal's ears. The side wings 7 are riveted or otherwise secured to the side or cheek straps 3 and are disposed to come exterior thereto, so that no portion of the blind comes in contact with the animal, thereby precluding injurious contact of the blind with the animal.

The blind is so proportioned that when the device is applied to an animal ample space is had for the free circulation of air and to enable the animal to feed properly, but the range of vision in advance and laterally is cut off, thereby deterring the animal from jumping over inclosures or frisking about to such an extent as to result disastrously to itself and property.

It will be seen that by disposing the blind and attaching it to the halter in the manner illustrated only the halter comes in contact with the animal and no injury can result by the use of the contrivance, such as not unfrequently happens where animal-pokes are employed to attain the end sought to be accomplished by the present invention.

Having thus described the invention, what is claimed as new is—

1. The combination with a halter, of a blind formed from a blank of sheet material comprising a body portion, a top and side wings, the several wings being bent from the same side of the body and attached to the head-stall and side straps of the halter, and having spaces upon each side of the top wing, the latter being designed to extend over and rest upon the head of the animal, and the side wings to embrace the animal's cheeks, substantially as shown and described.

2. A device of the character set forth, constructed substantially as herein described, the same comprising a halter and a blind, the latter formed from a sheet-metal blank comprising a body, a top and side wings, the adjacent edges of the wings being symmetrically and oppositely curved to provide spaces upon each side of the top wing, and the several wings being bent from the same side of the body at substantially right angles thereto and secured exterior to the head-stall and side straps, the top wing extending over the head, and the side wings embracing the animal's cheeks, substantially as set forth.

In testimony that I claim the foregoing as my own I have hereto affixed my signature in the presence of two witnesses.

ABEL S. SMITH.

Witnesses:
    B. E. SHELDON,
    S. H. SMITH.